(12) United States Patent
Veitch et al.

(10) Patent No.: US 8,006,651 B2
(45) Date of Patent: Aug. 30, 2011

(54) REVERSE-FLOW CONDENSING ECONOMIZER AND HEAT RECOVERY METHOD

(75) Inventors: Daniel H. Veitch, Churchill (CA); Cameron S. Veitch, Stouffville (CA)

(73) Assignee: Combustion & Energy Systems Ltd., Markham, Ontario (CA)

( * ) Notice: Subject to any disclaimer, the term of this patent is extended or adjusted under 35 U.S.C. 154(b) by 645 days.

(21) Appl. No.: 12/118,253

(22) Filed: May 9, 2008

(65) Prior Publication Data

US 2008/0282996 A1 Nov. 20, 2008

Related U.S. Application Data

(60) Provisional application No. 60/938,029, filed on May 15, 2007.

(51) Int. Cl.
*F22B 1/18* (2006.01)

(52) U.S. Cl. ...... 122/406.1; 122/31.1; 122/33; 165/108; 165/161; 165/168

(58) Field of Classification Search .......... 122/7 R, 122/406.1, 408.1, 29, 32, 33, 31.1; 165/166, 165/154, 173, 108, 168, 181, 164
See application file for complete search history.

(56) References Cited

U.S. PATENT DOCUMENTS

| | | | | |
|---|---|---|---|---|
| 2,596,057 | A * | 5/1952 | Van Heeckeren et al. | 60/524 |
| 3,628,508 | A | 12/1971 | Kummel | |
| 4,170,963 | A * | 10/1979 | Siegrist | 122/33 |
| 4,192,260 | A * | 3/1980 | Ostbo | 122/182.1 |
| 4,448,348 | A * | 5/1984 | Bidwell | 237/55 |
| 4,498,524 | A * | 2/1985 | Jacobsen | 165/292 |
| 4,700,772 | A | 10/1987 | Baumberger | |
| 5,699,756 | A * | 12/1997 | Ross et al. | 122/18.3 |
| 5,843,214 | A * | 12/1998 | Janes | 96/242 |
| 6,612,301 | B2 * | 9/2003 | Vago | 126/344 |
| 7,290,503 | B2 * | 11/2007 | Missoum et al. | 122/18.1 |
| 7,481,265 | B2 * | 1/2009 | Youssef | 165/134.1 |
| 2007/0181081 | A1 * | 8/2007 | Missoum et al. | 122/13.01 |

FOREIGN PATENT DOCUMENTS

WO 2007/084011 A1 7/2007
WO WO 2007084011 A1 * 7/2007

* cited by examiner

*Primary Examiner* — Gregory A Wilson
(74) *Attorney, Agent, or Firm* — Hodgson Russ LLP

(57) ABSTRACT

A condensing heat exchange economizer wherein upwardly flowing hot flue gas is redirected to flow in a downward direction over a bundle of heat exchange tubes carrying a counter-flowing heat exchange medium to form condensate and cool the flue gas, and the condensate is forced by gravity to flow in the downward direction. The economizer may be in the form of a cylindrical economizer adapted for insertion in an exhaust stack for flue gas. The cooled flue gas may be redirected to flow in an upward direction and merged with a primary flow passage leading to the stack.

19 Claims, 2 Drawing Sheets

US 8,006,651 B2

REVERSE-FLOW CONDENSING ECONOMIZER AND HEAT RECOVERY METHOD

CROSS-REFERENCE TO RELATED APPLICATIONS

This application claims priority benefit of U.S. Provisional Patent Application 60/938,029 filed May 15, 2007, which is incorporated herein by reference.

FIELD OF THE INVENTION

The present invention relates generally to condensing heat exchange systems and methods for recovering heat from flue or exhaust gases. As used in the present specification, the term "flue gas" means any flue gas and/or any exhaust gas.

BACKGROUND OF THE INVENTION

Condensing heat recovery involves the removal of a significant quantity of heat from waste exhaust gases, to the point where the exhaust gas actually condenses and water vapor drops out as condensate. Because of recent market forces urging energy efficiency, the application of condensing heat recovery has become more popular. Condensing heat recovery systems, or "economizers," are available as original equipment or for retrofit in a flue gas stack to allow heat energy to be recovered and used. In cylindrical economizers of the prior art, the rising flue gas enters the bottom of the economizer and is channeled upwardly across a tube bundle of a heat exchanger such that liquid condensate forms on the tubes of the heat exchanger and drops downward against the flow of the flue gas. Consequently, a portion of the condensate is re-evaporated by the hot flue gas and does not aid in heat transfer efficiency. Also, in existing designs where the exchanger tubes are in line with the exhaust gas traveling upward and the water being heated is draining downward, it is very difficult to keep the condensate from draining down into the boiler or heat source. Because the condensate is corrosive, its effect on heat source equipment is of great concern.

SUMMARY OF THE INVENTION

Therefore, it is an object of the present invention to provide an economizer for a flue gas stack that is more efficient from the standpoint of heat transfer. This, in turn, allows for the manufacture of smaller and less expensive economizers to achieve the same energy recovery benefits as larger and more expensive economizers of the prior art.

It is a further object of the present invention to provide an economizer for a flue gas stack that eliminates the problem of condensate drainage into the boiler or heat source equipment.

In accordance with the present invention, upwardly traveling flue gas is diverted into the top of a heat exchanger and is redirected to travel in a downward direction across a tube bundle of the heat exchanger. Cold water or other heat exchange medium enters the tube bundle at a lower inlet and flows toward an upper outlet. As condensate forms on the tubes, it drains downward across any lower tubes carrying colder medium, thereby increasing the heat transfer rate of the system. The cooled flue gas may then be redirected upwardly to rejoin the stack at a location above the location at which the flue gas was first diverted, and the condensate drains out of the stack passage. As used herein, "above" and "below" refer to relative heights at which two elements are located, and do not mean that one element is directly above or below another.

An economizer formed in accordance with an embodiment of the present invention generally comprises a flow duct, an inner shell arranged about the flow duct, and an outer shell arranged about the inner shell. The economizer thereby defines a primary flow passage through the flow duct, a secondary flow passage in the annular space between the flow duct and the inner shell, and a tertiary flow passage in the annular space between the inner shell and the outer shell. An adjustable damper is arranged in the primary flow passage to divert upwardly flowing flue gas outward through a plurality of redirection ports and into an upper region of the secondary flow passage, where flow is redirected in a downward direction (as used herein, the term "damper" means a damper or a baffle). A bundle of heat exchange tubes is enclosed within the inner shell in the secondary flow passage. The heat exchange tubes carry a heat exchange medium entering the bundle through a lower inlet and exiting the bundle through an upper outlet, and the flue gas interacts with the bundle of heat exchange tubes as the flue gas travels downwardly through the secondary flow passage such that condensate is formed. The condensate drains down and the flue gas is directed upwardly through the tertiary flow passage to reenter the primary flow passage above the damper via a plurality of merge ports providing communication between the tertiary and primary flow passages.

The invention also provides a method of recovering heat from hot flue gas generally comprising the steps of A) redirecting upwardly flowing flue gas to flow in a downward direction over a bundle of heat exchange tubes carrying a heat exchange medium to form condensate and cool the flue gas, wherein the condensate is forced by gravity to flow in the downward direction; and B) redirecting the cooled flue gas to flow in an upward direction.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
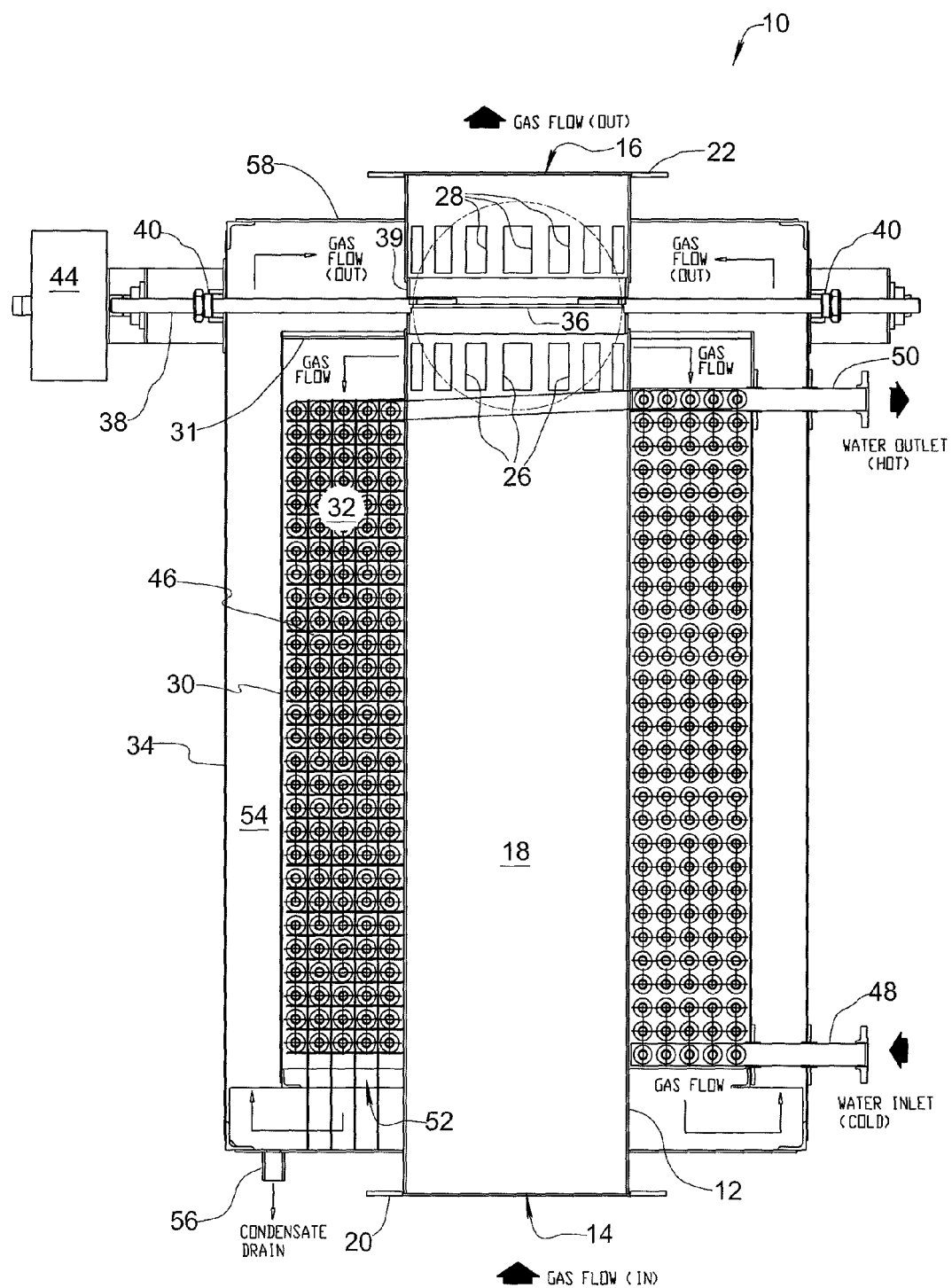
FIG. 1 is a schematic sectional view of an economizer formed in accordance with an embodiment of the present invention.
Figure 2:
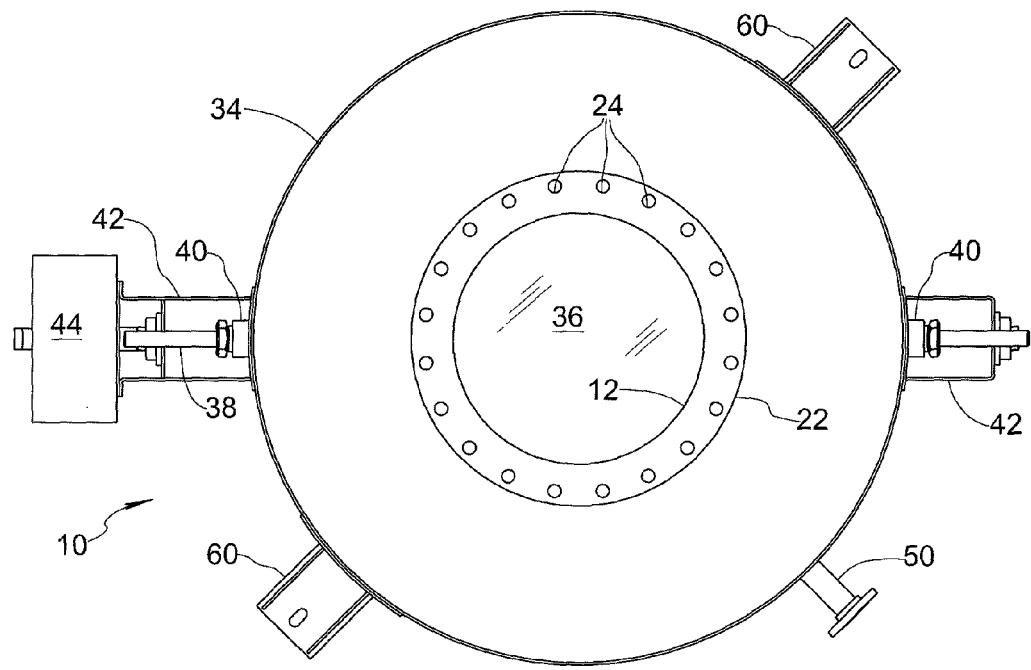
FIG. 2 is a top plan view thereof.
Figure 3:
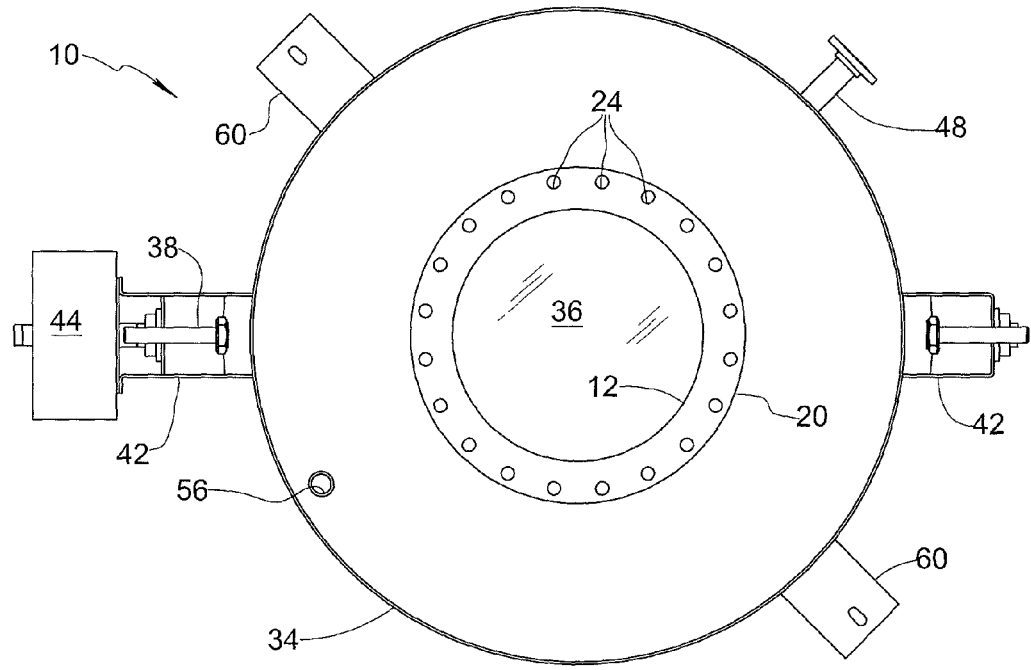
FIG. 3 is a bottom plan view thereof.

FIGS. 1-3 show an economizer 10 formed in accordance with an embodiment of the present invention. Economizer 10 is intended to be installed in-line with a flue gas stack for recovering heat energy carried by the hot flue gas that would otherwise be lost to the atmosphere.

Economizer 10 comprises a flow duct 12 having an inlet end 14 and an outlet end 16. Flow duct 12 defines a primary flow passage 18 for flue gas traveling in an upward direction. Flow duct 12 may be generally cylindrical in shape and includes a lower flange 20 and an upper flange 22 each having a pattern of bolt holes 24 for use in attachment of flow duct 12 in-line with a flue stack (not shown). Flow duct 12 also includes a plurality of redirection ports 26 arranged radially about a longitudinal axis of flow duct 12, and a plurality of merge ports 28 arranged in a similar manner at a location above and spaced from redirection ports 26 along the longitudinal axis of the flow duct.

Economizer 10 further comprises a generally cylindrical inner shell 30 arranged about flow duct 12 and having a top cover 31 to define an annular secondary flow passage 32 for flue gas traveling in a downward direction. As may be understood, redirection ports 26 provide flow communication between primary flow passage 18 and the secondary flow passage 32. A generally cylindrical outer shell 34 encloses inner shell 30.

A damper 36 is arranged in primary flow passage 18 just above redirection ports 26 and is operable to redirect upwardly traveling flue gas radially outward through redirection ports 26 and into secondary flow passage 32, where the redirected flue gas is confined for travel in a downward direction through the secondary flow passage. Damper 36 is disc-shaped and sized to occlude flow through primary passage 18 when it is orientated in a plane normal to the longitudinal axis of flow duct 12. Damper 36 is mounted on a horizontal axle 38 rotatably supported by bearings 40 and support brackets 42 mounted on outer shell 34, whereby damper 36 may be rotated about an axis defined by axle 38 to control the portion of flue gas diverted from primary flow passage 18 to secondary flow passage 32. The damper 36 and related parts may be incorporated into a damper assembly having a short tubular connecting duct 39 which joins upper and lower lengths of flow duct 12, or a one-piece flow duct 12 may be used having damper 36 and associated parts incorporated directly therein.

An operating condition wherein all the flue gas is diverted is shown in FIGS. 1-3, however damper 36 may be rotated by ninety degrees (see phantom line in FIG. 1) to open primary flow passage 18 so as not to divert flue gas to secondary flow passage 32; other intermediate orientations of damper 36 are also possible for diverting some or most of the flue gas. A motor 44 is shown mounted to one of the support brackets 42 for rotating axle 38 carrying damper 36, however a non-motorized mechanism for rotating axle 38 is also contemplated. Motor 44 may be connected to a remotely-located control system (not shown) to provide for remote operation of axle 38 and damper 36.

While a rotational damper is shown, other damper arrangements may be used, including a damper that slides into primary flow passage 18 or a damper that pivots into primary flow passage 18 about a vertical pivot axis, without straying from the present invention.

A bundle of heat exchange tubes 46 are enclosed within inner shell 30 and wrapped around flow duct 12 such that tubes 46 occupy secondary flow passage 32, whereby flue gas must travel across the tubes as it flows in a downward direction. Tubes 46 carry a heat exchange medium, for example water, entering the bundle through a lower inlet 48 in a relatively cold state and exiting the bundle through an upper outlet 50 in a heated state due to heat transfer associated with condensation of water vapor in the flue gas. As will be understood, the hot flue gas interacts initially with tubes higher up in the bundle which are carrying heat exchange medium that is warmer than it was when it traveled through the tubes lower down in the bundle, and as the flue gas is cooled it subsequently interacts with tubes lower down in the bundle which are carrying cooler heat exchange medium. Condensate formed on the tubes drains down and is not exposed to hot flue gas tending to re-vaporize the condensate as in the prior art. Accordingly, heat exchange efficiency of economizer 10 is improved.

The cooled flue gas and liquid condensate leave secondary passage 32 through a discharge opening 52 at a bottom end of inner shell 30. The arrangement of outer shell 34 about inner shell 30 defines an annular tertiary flow passage 54 for flue gas which communicates with primary flow passage 18 via merge ports 28. Outer shell 34 is provided with a condensate drain 56 through a bottom wall thereof, whereby condensate is allowed to flow out of economizer 10 without draining down through the stack into the boiler or heat source equipment. The flow of cooled flue gas is redirected upwardly through tertiary flow passage 54 until it meets with a top wall 58 of outer shell 34 and is forced through merge ports 28 back into primary flow passage 18 to continue flowing upwardly out of the stack. Outer shell 34 may be provided with external structural support members suitably arranged and configured for attaching economizer 10 to an existing exhaust stack and distributing weight in a safe manner. For example, support members 60 are shown in FIGS. 2 and 3. The particular arrangement and configuration of support members 60 will depend upon the design of economizer 10 and the mounting conditions of the exhaust stack into which economizer 10 is incorporated, and are subject to design choice.

The embodiment described above provides a flow duct 12, inner shell 30, and outer shell 34 that are aligned coaxially with one another and which install in line with an exhaust stack. However, the invention is not limited to a coaxial embodiment, and other non-coaxial configurations defining the primary, secondary, and tertiary flow passages are possible. It is contemplated to fabricate the components of economizer 10 from stainless steel or structural aluminum, with suitable surface treatments being provided to resist corrosion.

As will be appreciated from the foregoing description, the present invention further encompasses a method of recovering heat from hot flue gas. The method generally comprises the steps of redirecting upwardly flowing flue gas to flow in a downward direction over a bundle of heat exchange tubes carrying a heat exchange medium to form condensate and cool the flue gas, wherein the condensate is forced by gravity to flow in the downward direction; and redirecting the cooled flue gas to flow in an upward direction.

What is claimed is:

1. An economizer for installation in a flue gas stream to recover heat energy from the flue gas stream, the economizer comprising:

a flow duct having an inlet end and an outlet end, the flow duct defining a primary flow passage for flue gas traveling in an upward direction;

an inner shell arranged about the flow duct to define a secondary flow passage for flue gas traveling in a downward direction, wherein the flow duct includes at least one redirection port for providing flow communication between the primary flow passage and the secondary flow passage;

a damper arranged in the primary flow passage above the at least one redirection port, the damper redirecting upwardly traveling flue gas through the at least one redirection port and into the secondary flow passage, wherein the redirected flue gas travels in a downward direction through the secondary flow passage;

a bundle of heat exchange tubes enclosed within the inner shell in the secondary flow passage, the heat exchange tubes carrying a heat exchange medium, wherein the flue gas interacts with the bundle of heat exchange tubes as the flue gas travels in the downward direction through the secondary flow passage such that condensate is formed, the condensate flowing in the downward direction by force of gravity; and an outer shell arranged about the inner shell to define a tertiary flow passage for flue gas;

the inner shell having a discharge opening below the bundle of heat exchange tubes for providing flow communication between the secondary flow passage and the tertiary flow passage;

wherein the flow duct includes at least one merge port above the damper for providing flow communication between the tertiary flow passage and the primary flow passage, whereby cooled flue gas reenters the primary flow passage.

2. The economizer according to claim 1, wherein the flow duct, the inner shell, and the outer shell are coaxially arranged.

3. The economizer according to claim 1, wherein the at least one redirection port includes a plurality of redirection ports arranged radially about a longitudinal axis of the flow duct and extending through a wall of the flow duct.

4. The economizer according to claim 1, wherein the at least one merge port includes a plurality of merge ports arranged radially about a longitudinal axis of the flow duct and extending through a wall of the flow duct.

5. The economizer according to claim 1, wherein the damper is adjustable relative to the primary flow passage to redirect none, some, or all of the upwardly traveling flue gas through the at least one redirection port.

6. The economizer according to claim 5, further comprising a motor operatively connected to the damper for automatically adjusting the damper relative to the primary flow passage.

7. The economizer according to claim 1, wherein the heat exchange medium enters the bundle through an inlet and exits the bundle through an outlet above the inlet.

8. The economizer according to claim 1, wherein the outer shell has a condensate drain through which condensate is removed from the economizer.

9. An economizer for installation in a flue gas stream to recover heat energy from the flue gas stream, the economizer comprising:
   a system defining a primary flow passage through which flue gas travels in an upward direction, a secondary flow passage in flow communication with the primary flow passage through at least one redirection port, and a tertiary flow passage in flow communication with the secondary flow passage through a discharge opening below the at least one redirection port, the tertiary flow passage being in flow communication with the primary flow passage through at least one merge port above the at least one redirection port;
   a damper arranged in the primary flow passage above the at least one redirection port and below the at least one merge port, the damper redirecting upwardly traveling flue gas through the at least one redirection port and into the secondary flow passage, wherein the redirected flue gas travels in a downward direction through the secondary flow passage;
   a bundle of heat exchange tubes located in the secondary flow passage, the heat exchange tubes carrying a heat exchange medium, wherein flue gas interacts with the bundle of heat exchange tubes as the flue gas travels in the downward direction through the secondary flow passage such that condensate is formed, the condensate flowing in the downward direction by force of gravity;
   wherein flue gas is returned to the primary flow passage in a cooled state by way of the tertiary flow passage and the at least one merge port.

10. The economizer according to claim 9, wherein the primary passage, the secondary passage, and the tertiary passage are coaxially arranged.

11. The economizer according to claim 9, wherein the at least one redirection port includes a plurality of redirection ports arranged radially about a longitudinal axis of the primary flow passage.

12. The economizer according to claim 9, wherein the at least one merge port includes a plurality of merge ports arranged radially about a longitudinal axis of the flow duct and extending through a wall of the flow duct.

13. The economizer according to claim 9, wherein the damper is adjustable relative to the primary flow passage to redirect none, some, or all of the upwardly traveling flue gas through the at least one redirection port.

14. The economizer according to claim 13, further comprising a motor operatively connected to the damper for automatically adjusting the damper relative to the primary flow passage.

15. The economizer according to claim 9, wherein the heat exchange medium enters the bundle through an inlet and exits the bundle through an outlet above the inlet.

16. The economizer according to claim 9, wherein the system includes a condensate drain through which condensate is removed from the economizer.

17. A method of recovering heat from hot flue gas, the method comprising the steps of:
   positioning a damper in a primary flow passage carrying upwardly flowing flue gas to redirect the upwardly flowing flue gas to flow in a downward direction through a secondary flow passage;
   providing a bundle of heat exchange tubes in a flow path of the downwardly flowing flue gas, the heat exchange tubes carrying a heat exchange medium, wherein the downwardly flowing flue gas interacts with the heat exchange tubes to form condensate and cool the flue gas;
   redirecting the flue gas flowing downwardly through the secondary flow passage to flow in an upward direction through a tertiary flow passage; and
   merging the tertiary flow passage with the primary flow passage at a location above the damper to redirect the flue gas flowing upwardly through the tertiary flow passage to flow upwardly through the primary flow passage.

18. The method according to claim 17, wherein the heat exchange tubes are distributed at different heights such that condensate flows down under force of gravity from upper heat exchange tubes onto lower heat exchange tubes.

19. The method according to claim 18, wherein the heat exchange medium enters the bundle of heat exchange tubes through an inlet and exits the bundle through an outlet above the inlet, whereby the heat exchange medium increases in temperature as it travels from lower heat exchanges tubes to upper heat exchange tubes in the bundle.

* * * * *